(12) United States Patent
Zhou (10) Patent No.: US 12,363,207 B2
(45) Date of Patent: Jul. 15, 2025

(54) METHOD AND SYSTEM FOR DATA TRANSMISSION, ELECTRONIC DEVICE, AND NON-TRANSITORY STORAGE MEDIUM

(71) Applicant: SPREADTRUM COMMUNICATIONS (SHANGHAI) CO., LTD., Shanghai (CN)

(72) Inventor: Bin Zhou, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/017,622

(22) PCT Filed: Jul. 26, 2021

(86) PCT No.: PCT/CN2021/108323
§ 371 (c)(1),
(2) Date: Jan. 23, 2023

(87) PCT Pub. No.: WO2022/017529
PCT Pub. Date: Jan. 27, 2022

(65) Prior Publication Data
US 2025/0030786 A1 Jan. 23, 2025

(30) Foreign Application Priority Data
Jul. 24, 2020 (CN) .......................... 202010733936.0

(51) Int. Cl.
*H04L 69/163* (2022.01)
*H04W 80/06* (2009.01)
(52) U.S. Cl.
CPC ........... *H04L 69/163* (2013.01); *H04W 80/06* (2013.01)
(58) Field of Classification Search
None
See application file for complete search history.

(56) References Cited

U.S. PATENT DOCUMENTS 10,321,514 B2    6/2019  Pang et al.
2002/0146016 A1* 10/2002 Liu ................. H04L 69/165
                                                370/401
(Continued)

FOREIGN PATENT DOCUMENTS

CN    102006283 A    4/2011
CN    108512833 A    9/2018
(Continued)

OTHER PUBLICATIONS

International Search Report received in PCT Application No. PCT/CN2021/108323, dated Nov. 3, 2021 in 6 pages.
(Continued)

*Primary Examiner* — Younes Naji
(74) *Attorney, Agent, or Firm* — Knobbe Martens Olson & Bear LLP (57) ABSTRACT

A method and system for data transmission, and a non-transitory storage medium. The method for data transmission is applied to a receiving terminal. The receiving terminal includes a Transmission Control Protocol (TCP) data transmission module. The method includes: monitoring a TCP packet currently stored in the TCP data transmission module, the TCP packet includes a TCP acknowledgment (ACK) packet and a TCP data packet; determining whether the TCP ACK packet and the TCP data packet coexist in the stored TCP packets; and in response to the determination that the TCP ACK packet and the TCP data packet coexist in the TCP packet, processing the TCP ACK packet. In the present disclosure, a type of the packet currently stored in the receiving terminal is determined. If the TCP ACK packet and the TCP data packet coexist, the TCP ACK packet is processed.

15 Claims, 2 Drawing Sheets

(56) References Cited

U.S. PATENT DOCUMENTS

| | | | | |
|---|---|---|---|---|
| 2009/0172184 A1* | 7/2009 | Wason | ............... | H04L 69/16 |
| | | | | 709/237 |
| 2013/0250767 A1* | 9/2013 | Zhong | ............ | H04L 47/2466 |
| | | | | 370/235 |
| 2015/0215218 A1* | 7/2015 | Kanamarlapudi | .. | H04L 47/2466 |
| | | | | 370/235 |
| 2018/0132263 A1* | 5/2018 | Nuggehalli | ...... | H04W 72/569 |

FOREIGN PATENT DOCUMENTS

| | | |
|---|---|---|
| CN | 109983740 A | 7/2019 |
| CN | 110430024 A | 11/2019 |
| CN | 111865828 A | 10/2020 |

OTHER PUBLICATIONS

Office Action received in Chinese Application No. CN 202010733936.0, dated Dec. 29, 2020 in 14 pages.

\* cited by examiner

METHOD AND SYSTEM FOR DATA TRANSMISSION, ELECTRONIC DEVICE, AND NON-TRANSITORY STORAGE MEDIUM

CROSS-REFERENCE TO RELATED APPLICATIONS

The present application is a National Phase of International Application No. PCT/CN2021/108323, filed on Jul. 26, 2021, which claims priority to Chinese Patent Application No. 202010733936.0, filed on Jul. 24, 2020, the contents of which are incorporated herein by reference in their entireties.

TECHNICAL FIELD

The present disclosure relates to the field of communications and, in particular, to a method and system for data transmission, an electronic device, and a non-transitory storage medium.

BACKGROUND

With explosive use of mobile communication devices, there is an increasing interest in mobile Internet and web-based applications. Transmission Control Protocol (TCP), as a popular transport layer protocol on the Internet, is responsible for providing highly reliable data transmission over wired and wireless links.

A transmission capability of a network is generally reflected by the transmission rate per unit time, namely, the throughput. When a transmitting terminal transmits a large quantity of TCP packets to a receiving terminal, the receiving terminal often has difficulty in feeding back to the transmitting terminal in time whether the TCP packets transmitted by the transmitting terminal are successfully received. It is difficult for the transmitting terminal to improve its transmitting rate, so that the transmitting rate has to be reduced. The rate at which the transmitting terminal transmits TCP data packets is limited. Consequently, a receiving throughput of the receiving terminal is reduced.

SUMMARY

The present disclosure provides a method and system for data transmission, an electronic device, and a non-transitory storage medium that can improve a receiving throughput, to resolve a technical problem in the related art that throughput of a transmitting terminal and a receiving terminal are low when a large amount of data is exchanged.

The present disclosure resolves the technical problem through the following technical solutions.

In a first aspect, the present disclosure provides a method for data transmission. The method for data transmission is applied to a receiving terminal. The receiving terminal includes a TCP data transmission module. The method for data transmission includes: monitoring a TCP packet currently stored in the TCP data transmission module, wherein the TCP packet comprises a TCP acknowledgment (ACK) packet and a TCP data packet, and the TCP data packet comprises another type of TCP packet other than the TCP ACK packet; determining whether the TCP ACK packet and the TCP data packet coexist in the TCP packet; and in response to the determination that the TCP ACK packet and the TCP data packet coexist in the TCP packet, processing the TCP ACK packet.

In some embodiments, the TCP data transmission module comprises a first data storage queue and a second data storage queue, the first data storage queue is configured to store the TCP ACK packet, and the second data storage queue is configured to store the TCP data packet. The method for data transmission further includes: in response to receiving the TCP packet transmitted by a transmitting terminal, storing the TCP ACK packet in the TCP packet in the first data storage queue, and storing the TCP data packet in the TCP packet in the second data storage queue.

In some embodiments, in condition that the TCP ACK packet and the TCP data packet do not coexist, the method further includes: in response to only the TCP data packet exists in the TCP packet, determining whether an amount of data currently processed and to be transmitted by the receiving terminal reaches a data amount threshold in a current network environment; and in response to the amount of data does not reach the data amount threshold, processing the TCP data packet; or in response to the amount of data reaches the data amount threshold, determining whether the receiving terminal has enough data to transmit next time to avoid wasting grant or assignment then, and in response to the receiving terminal has adequate data to transmit for the next time, determining whether the TCP ACK packet and the TCP data packet coexist in the stored TCP packets.

In some embodiments, prior to said determining whether the amount of data currently processed and to be transmitted by the receiving terminal reaches the data amount threshold in the current network environment, the method further includes: calculating the data amount threshold based on the maximum transmitting capability configured by the current network environment for the receiving terminal and the previous actual transmitting condition of the receiving terminal within a preset time interval.

In some embodiments, processing the TCP ACK packet includes: numbering the TCP ACK packet to determine a transmission priority of the TCP ACK packet.

In some embodiments, after the TCP ACK packet is numbered, the method further includes: encrypting the numbered TCP ACK packet.

In a second aspect, the present disclosure further provides a system for data transmission. The system for data transmission is applied to a receiving terminal, wherein the receiving terminal comprises a transmission control protocol (TCP) data transmission module configured to store and transmit a TCP packet, and the TCP packet comprises a TCP acknowledgment (ACK) packet and a TCP data packet. The system for data transmission further includes a storage monitoring module and a packet determining module. The storage monitoring module is configured to monitor the TCP packet currently stored in the TCP data transmission module. The storage monitoring module is further configured to call the packet determining module. The packet determining module is configured to determine whether the TCP ACK packet and the TCP data packet coexist in the stored TCP packets; and process, in response to the TCP ACK packet and the TCP data packet coexist, the TCP ACK packet.

In some embodiments, the TCP data transmission module comprises a first data storage queue and a second data storage queue, the first data storage queue is configured to store the TCP ACK packet, and the second data storage queue is configured to store the TCP data packet. The TCP data transmission module is further configured to: in response to receiving the TCP packet transmitted by a transmitting terminal, store the TCP ACK packet in the TCP packet in the first data storage queue and store the TCP data packet in the TCP packet in the second data storage queue.

In some embodiments, the packet determining module is further configured to: in condition that the TCP ACK packet and the TCP data packet do not coexist, in response to only the TCP data packet exists in the TCP packet, determine whether an amount of data currently processed and to be transmitted by the receiving terminal reaches a data amount threshold in a current network environment; and in response to the amount of data does not reach the data amount threshold, process the TCP data packet; or in response to the amount of data reaches the data amount threshold, determine whether the receiving terminal has enough data to transmit next time to avoid wasting grant or assignment then, and in response to the receiving terminal has adequate data to transmit for the next time, determine whether the TCP ACK packet and the TCP data packet coexist in the stored TCP packets.

In some embodiments, the system for data transmission further includes a threshold calculation module configured to calculate the data amount threshold based on the maximum transmitting capability configured by the current network environment for the receiving terminal and the previous actual transmitting condition of the receiving terminal within a preset time interval.

In some embodiments, the packet determining module includes a numbering unit. The numbering unit is configured to number the TCP ACK packet to determine a transmission priority of the TCP ACK packet.

In some embodiments, the packet determining module further includes an encryption unit. The numbering unit is further configured to: subsequent to numbering the TCP ACK packet, call the encryption unit. The encryption unit is configured to encrypt the numbered TCP ACK packet.

In a third aspect, the present disclosure further provides an electronic device, including a memory, a processor, and a computer program stored in the memory and executable on the processor. The processor, when executing the computer program, implements the method for data transmission according to the first aspect.

The present disclosure further provides a non-transitory storage medium storing a computer program. The computer program, when executed by a processor, implements the steps of the method for data transmission according to the first aspect.

DESCRIPTION OF EMBODIMENTS

The present disclosure is further described below through embodiments, but the present disclosure is not limited to the scope of the described embodiments.

In embodiments of the present disclosure, when data transmission is performed through TCP, there are a plurality of transaction scenarios. For example, bidirectional concurrent transmission through TCP and uploading are performed on a mobile phone when downloading is performed through File Transfer Protocol (FTP). It is found in practice that for a terminal, a downloading rate depends on whether the terminal feeds back a TCP ACK packet in time. In response that the terminal cannot feed back the TCP ACK packet in time, a rate at which a peer end transmits a TCP data packet is limited. Consequently, a receiving throughput is reduced.

In some embodiments, in certain scenarios, when the TCP ACK packet and the TCP data packet simultaneously arrive at a receiving terminal, the TCP ACK packet may be transmitted prior to the TCP data packet. However, "prior to" is often not global.

In some embodiments, in a Long Term Evolution (LTE) protocol stack of the terminal, when the TCP ACK packet and the TCP data packet simultaneously arrive at the receiving terminal, the receiving terminal (for example, Packet Data Convergence Protocol (PDCP)) independently queues, stores, and numbers the TCP ACK packet and the TCP data packet, and processes data in a TCP ACK queue in higher priority. However, priority of the TCP ACK packet in this scenario can be reflected only before PDCP numbers the packet. After the TCP ACK packet and the TCP data packet are numbered, a transmitting order is determined. For TCP service data, PDCP needs to transmit the data packet in the numbering order. For example, when the TCP data packet arrives at the receiving terminal prior to the TCP ACK packet, the TCP data packet is first stored and processed based on its number, and then the TCP ACK packet is stored. A transmission priority is determined in which the TCP data packet is transmitted prior to the TCP ACK packet.

In other words, generally, the TCP ACK packet and the TCP data packet can be numbered to determine a transmission priority of the TCP ACK packet only in response to the TCP ACK packet and the TCP data packet simultaneously arriving at the receiving terminal. However, when a large amount of data is exchanged between the receiving terminal and a transmitting terminal, a situation that the TCP ACK packet and the TCP data packet simultaneously arrive at the receiving terminal is limited, which is also very limited in helping the receiving terminal feed back the TCP ACK packet in an accelerated manner for improving the receiving throughput. In circumstances that the receiving terminal cannot feed back the TCP ACK packet to the transmitting terminal in time, a transmitting rate of the transmitting terminal cannot be improved, and a quantity of TCP packets transmitted to the receiving terminal may even be reduced through automatic adjustment.

Therefore, embodiments of the present disclosure provide a method and system for data transmission, an electronic device, and a non-transitory storage medium. A receiving terminal can feed back a TCP ACK packet to a transmitting terminal in an accelerated manner. When receiving more TCP ACK packets, the transmitting terminal increases a quantity of TCP packets transmitted to the receiving terminal through automatic adjustment. As a result, the receiving terminal can receive more TCP packets. In this way, throughput of the receiving terminal and the transmitting terminal are improved.

It should be understood that the receiving terminal and the transmitting terminal in embodiments of the present disclosure are merely two opposite terminals defined for convenience of description. The transmitting terminal may also be configured to receive data, and the receiving terminal may also be configured to transmit data. In other words, the receiving terminal may also serve as a transmitting terminal to transmit a TCP packet to a peer end, and the transmitting terminal may also serve as a receiving terminal to receive a packet transmitted by a peer end.

Figure 1:
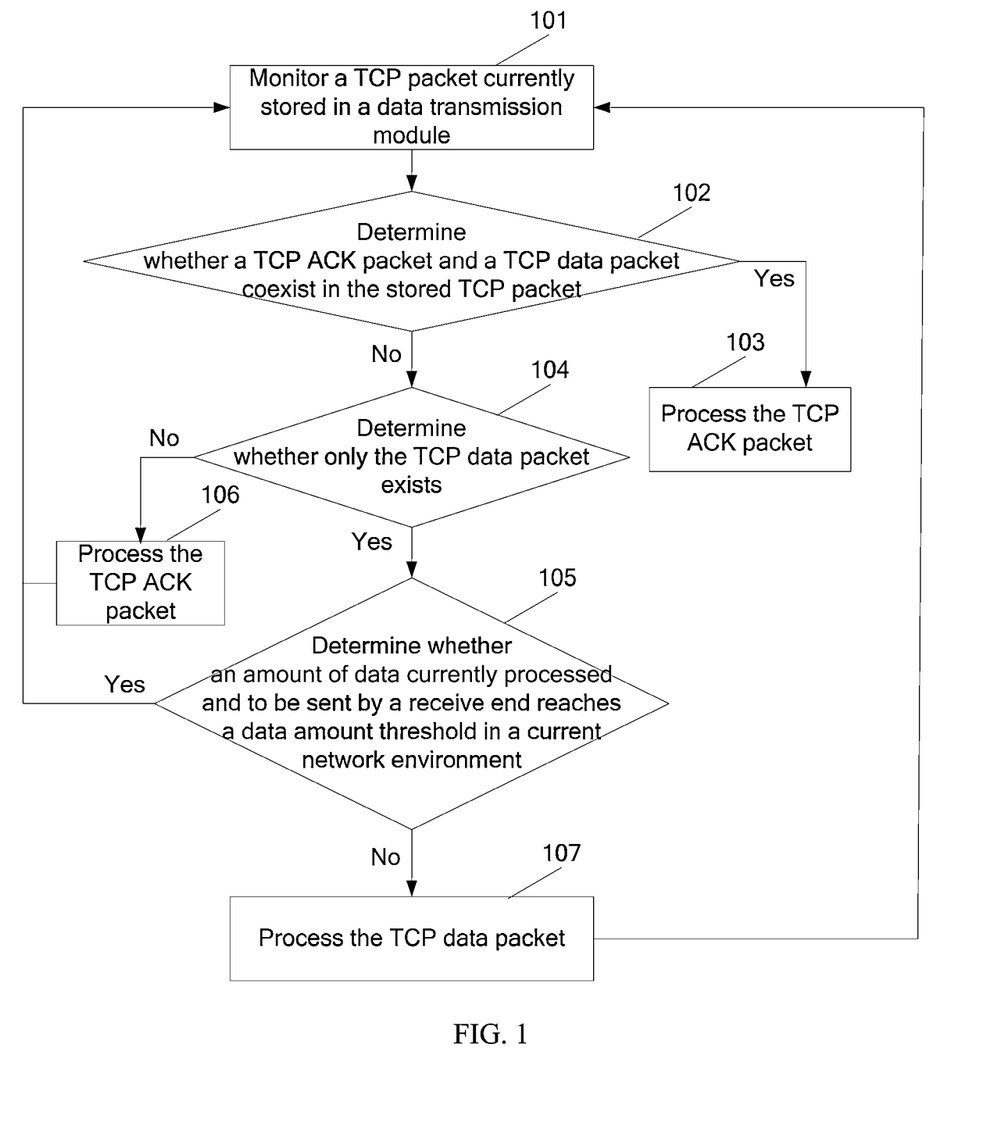
FIG. 1 is a flowchart of a method for data transmission according to one or more embodiments of the present disclosure.

In some embodiments, the receiving terminal and the transmitting terminal are two terminals that transmit data to and receive data from each other. The terminal may be various forms of user equipment (UE), an access terminal, a subscriber unit, a subscriber station, a mobile platform, a mobile station (MS), a remote station, a remote terminal, a mobile device, a subscriber terminal, a terminal device, a wireless communication device, a user agent, or a user apparatus. The terminal device may be a cellular phone, a cordless phone, a Session Initiation Protocol (SIP) phone, a Wireless Local Loop (WLL) station, a personal digital assistant (PDA), a handheld device having wireless communication function, a computing device or another processing device connected to a wireless modem, a vehicle-mounted device, a wearable device, a terminal device in a 5G network or a future evolved public land mobile network (PLMN), or the like. This is not limited in embodiments of the present application. The technical solutions of the present disclosure are described below through specific embodiments:

Some embodiments provide a method for data transmission. The method for data transmission is applied to a receiving terminal. The receiving terminal includes a TCP data transmission module. As shown in FIG. 1, the method for data transmission includes:

At S101, a TCP packet currently stored in the data transmission module is monitored.

At S101, the TCP packet currently stored in the transmission module may be monitored in real time. For example, the TCP packet currently stored may be monitored at a specific interval.

In some embodiments, a transmitting terminal transmits the TCP packet to the receiving terminal. The TCP data transmission module of the receiving terminal receives and stores the TCP packet transmitted by the transmitting terminal. The TCP packet is classified as a TCP ACK packet or a TCP data packet. The TCP data packet is a type of TCP packet other than the TCP ACK packet.

The TCP data transmission module includes a first data storage queue and a second data storage queue. The first data storage queue is configured to store the TCP ACK packet. The second data storage queue is configured to store the TCP data packet. In response to the TCP packet transmitted by the transmitting terminal being received, the TCP ACK packet in the TCP packet is stored in the first data storage queue, and the TCP data packet in the TCP packet is stored in the second data storage queue.

In some embodiments, the TCP packet transmitted by the transmitting terminal is undifferentiated. In other words, the TCP packet received by the receiving terminal includes a mixture of the TCP ACK packet and the TCP data packet. In this case, the data transmission module of the receiving terminal detects a type of the received TCP packet, and stores the TCP ACK packet in the first data storage queue and the TCP data packet in the second data storage queue.

In some other embodiments, the TCP packet transmitted by the transmitting terminal is differentiated. In other words, the transmitting terminal separately transmits the TCP ACK packet and the TCP data packet to the receiving terminal. In this case, the receiving terminal may directly store the received TCP ACK packet in the first data storage queue and the received TCP data packet in the second data storage queue.

At S102, it is determined whether the TCP ACK packet and the TCP data packet coexist in the stored TCP packets. If yes, S103 is performed. If no, S104 is performed.

In some embodiments, at S102, it is determined whether the TCP ACK packet exists in the first data storage queue and whether the TCP data packet exists in the second data storage queue.

At S103, the TCP ACK packet is processed. S101 is returned to after a preset time interval.

It should be understood that there are many ways to process the TCP packet. The purpose of processing the TCP packet is to determine a transmitting order of the TCP packet. That is, a TCP packet processed first is transmitted prior to a TCP packet processed later. The way to process the TCP packet is not limited in the present disclosure. In some embodiments, the TCP ACK packet stored in the first data storage queue is processed first such that the TCP ACK packet processed first can be transmitted prior to another TCP packet processed later.

In some embodiments, at S103, the TCP ACK packet may be processed through at least the following: the TCP ACK packet is numbered to determine a transmission priority of the TCP ACK packet.

In some embodiments, after the TCP ACK packet is numbered, the numbered TCP ACK packet may be further encrypted such that the transmission priority of the TCP ACK packet can be fixed, to prevent the transmitting order from being tampered.

At S104, it is determined whether only the TCP data packet exists. If yes, S105 is performed. If no, S106 is performed.

When S104 is performed, no TCP ACK packet is stored in the first data storage queue in response to only the TCP data packet exists.

At S105, it is determined whether an amount of data currently processed and to be transmitted by the receiving terminal reaches a data amount threshold in a current network environment. If no, S107 is performed. If yes, when the receiving terminal has enough data to transmit next time, S101 is returned to, to continue monitoring the TCP packet currently stored in the data transmission module.

The amount of data currently processed and to be transmitted is an amount of data to be transmitted that has been processed in a current cycle and can be transmitted immediately. Processed means partially processed and ready to be transmitted. For example, the processing includes numbering, encryption, and packet group. It should be understood that the packet group is packet group at an upper layer, such as PDCP packet group.

The data amount threshold may be set based on an actual requirement. In some embodiments, the data amount threshold may be calculated based on a maximum transmitting capability configured by a current network for the receiving terminal and an actual transmitting condition of the receiving terminal within a previous preset time range. For example, the maximum transmitting capability configured by the network for the receiving terminal in the current network environment is a first value, and an average amount of data actually transmitted by the receiving terminal in previous cycles is a second value. In some cases, if the second value is greater than the first value, the data amount threshold needs to be set to be less than the first value. In some other cases, if the second value is less than the first value, the data amount threshold may be evaluated based on the second value or comprehensively evaluated based on the first value and the second value.

In some embodiments, the data amount threshold is calculated based on the maximum transmitting capability configured by the current network for the receiving terminal and the actual transmitting condition of the receiving terminal, to prevent the TCP data packet from being transmitted prior to the TCP ACK packet and further enable the TCP ACK packet to be transmitted in higher priority in a larger data range.

At S105, if it is determined that in the current network environment, for example, under a current link condition of the network, the TCP packet to be processed by the receiving terminal in the current cycle affects an overall transmitting throughput and the impact on the overall transmitting throughput is unacceptable, S101 is returned to. That is, processing of the TCP data packet stored in the second data storage queue is suspended, and the monitoring of the TCP packet currently stored in the data transmission module is continued. Under the condition that the TCP packet to be processed by the receiving terminal in the current cycle does not affect the overall transmitting throughput or the impact is acceptable, S107 is performed. That is, the TCP data packet stored in the second data storage queue starts to be processed.

At S106, the TCP ACK packet is processed. When the receiving terminal is ready to transmit the data for the next time, S101 is returned to, to continue monitoring the TCP packet currently stored in the data transmission module.

It should be understood that a way to process the TCP ACK packet at S106 is the same as the way to process the TCP ACK packet at S103. Details are not described herein again.

At S107, the TCP data packet is processed. S101 is returned to after the preset time interval.

It should be understood that at S107, a part or all of data in the second data storage queue may be processed, as long as the transmitting throughput of the receiving terminal in the current network environment is not affected.

A way to process the TCP data packet at S107 is the same as the way to process the TCP ACK packet at S103. Details are not described herein again.

In some embodiments, the transmitting terminal confirms a data amount of the transmitted TCP packet based on a data amount confirmed through the received TCP ACK packet. The data amount confirmed through the received TCP ACK packet is positively correlated with the data amount of the transmitted TCP packet.

In some embodiments, the type of the packet currently stored in the receiving terminal is monitored in real time. In response that the TCP ACK packet and the TCP data packet coexist, the TCP ACK packet is processed in higher priority. If only the TCP data packet exists, it is determined based on the current network environment whether to process the TCP data packet. In this way, the receiving terminal can feed back a TCP ACK to the transmitting terminal in an accelerated manner after receiving the TCP packet transmitted by the transmitting terminal while stability of the throughput of the receiving terminal and the transmitting terminal is ensured. Therefore, the transmitting throughput of the transmitting terminal can be improved, and thus the receiving throughput of the receiving terminal is also improved.

Figure 2:
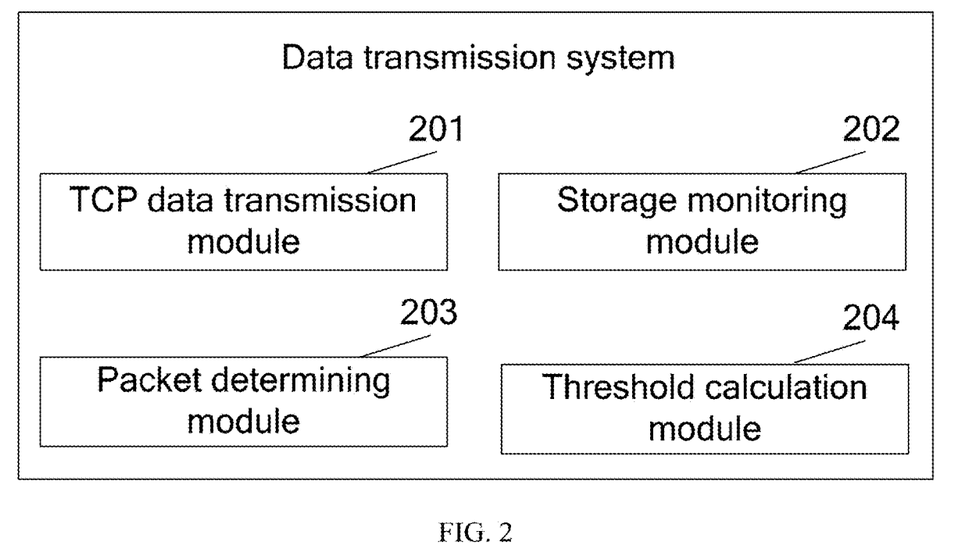
FIG. 2 is a schematic diagram of modules of a system for data transmission according to one or more embodiments of the present disclosure.

Some embodiments provide a system for data transmission. The system for data transmission is applied to a receiving terminal. As shown in FIG. 2, the system for data transmission includes a TCP data transmission module 201, a storage monitoring module 202, a packet determining module 203, and a threshold calculation module 204.

The TCP data transmission module 201 is configured to store and transmit a TCP packet.

The TCP data transmission module 201 is configured to store the TCP packet in response to receiving the TCP packet transmitted by a transmitting terminal.

The storage monitoring module 202 is configured to monitor the TCP packet currently stored in the TCP data transmission module 201.

The storage monitoring module 202 may monitor the TCP packet currently stored in the transmission module in real time, for example, monitor the TCP packet currently stored at a certain interval. In some embodiments, the transmitting terminal transmits the TCP packet to the receiving terminal. The TCP data transmission module 201 of the receiving terminal receives and stores the TCP packet transmitted by the transmitting terminal. The TCP packet is classified as a TCP ACK packet or a TCP data packet. The TCP data packet is a type of TCP packet other than the TCP ACK packet.

The TCP data transmission module 201 includes a first data storage queue and a second data storage queue. The first data storage queue is configured to store the TCP ACK packet. The second data storage queue is configured to store the TCP data packet. In response to receiving the TCP packet transmitted by the transmitting terminal, the TCP data transmission module 201 stores the TCP ACK packet in the TCP packet in the first data storage queue and the TCP data packet in the TCP packet in the second data storage queue.

In some embodiments, the TCP packet transmitted by the transmitting terminal is undifferentiated. In other words, the TCP packet received by the TCP data transmission module 201 of the receiving terminal includes a mixture of the TCP ACK packet and the TCP data packet. In this case, the TCP data transmission module 201 of the receiving terminal detects a type of the received TCP packet, and stores the TCP ACK packet in the first data storage queue and the TCP data packet in the second data storage queue.

In some other embodiments, the TCP packet transmitted by the transmitting terminal is differentiated. In other words, the receiving terminal separately transmits the TCP ACK packet and the TCP data packet to the transmitting terminal. In this case, the TCP data transmission module 201 of the receiving terminal may directly store the received TCP ACK packet in the first data storage queue and the received TCP data packet in the second data storage queue.

In some embodiments, the packet determining module 203 is configured to determine whether the TCP ACK packet and the TCP data packet coexist in the stored TCP packets.

If yes, the TCP ACK packet is processed. After a preset time interval, the storage monitoring module 202 is called again to monitor the currently stored TCP packets, and it is determined whether the TCP ACK packet and the TCP data packet coexist in the stored TCP packets.

If no, it is determined whether only the TCP data packet exists.

In response to the situation that only the TCP data packet exists, it is determined whether an amount of data currently processed and to be transmitted by the receiving terminal reaches a data amount threshold in a current network environment. If no, the TCP data packet is processed, and the storage monitoring module 202 is called again at the preset interval to monitor the TCP packet currently stored in the data transmission module. If yes, in response to the situation that the receiving terminal is ready to transmit the data for the next time, the storage monitoring module 202 is called to monitor the TCP packet currently stored in the data transmission module.

In response to the situation that only the TCP ACK packet exists, the TCP ACK packet is processed, and in response to the situation that the receiving terminal has enough data to transmit next time, the storage monitoring module 202 is called to monitor the TCP packet currently stored in the data transmission module.

The amount of data currently processed and to be transmitted is an amount of data to be transmitted that has been processed in a current cycle and can be transmitted immediately. Processed means partially processed and ready to be transmitted. For example, the processing includes numbering, encryption, and packet group. It should be understood that the packet group is packet group at an upper layer, for example, PDCP packet group.

The data amount threshold may be calculated by the threshold calculation module 204. The data amount threshold may be set based on an actual requirement. In some embodiments, the threshold calculation module 204 may calculate the data amount threshold based on a maximum transmitting capability configured by a current network for the receiving terminal and an actual transmitting condition of the receiving terminal within a previous preset time range. For example, the maximum transmitting capability configured by the network for the receiving terminal in the current network environment is a first value, and an average amount of data actually transmitted by the receiving terminal in previous cycles is a second value. In some cases, if the second value is greater than the first value, the data amount threshold needs to be set to be less than the first value. In some other cases, if the second value is less than the first value, the data amount threshold may be evaluated based on the second value or comprehensively evaluated based on the first value and the second value.

In some embodiments, the threshold calculation module calculates the data amount threshold based on the maximum transmitting capability configured by the current network for the receiving terminal and the actual transmitting condition of the receiving terminal, to prevent the TCP data packet from being transmitted prior to the TCP ACK packet and further enable the TCP ACK packet to be transmitted in higher priority in a larger data range. In some embodiments, the packet determining module 203 is configured to determine whether the TCP ACK packet exists in the first data storage queue and whether the TCP data packet exists in the second data storage queue. It should be understood that there are many ways to process the TCP packet by the packet determining module 203. The purpose of processing the TCP packet is to determine a transmitting order of the TCP packet. That is, a TCP packet processed first is transmitted prior to a TCP packet processed later. The way to process the TCP packet is not limited in the present disclosure. In some embodiments, the TCP ACK packet stored in the first data storage queue is processed first such that the TCP ACK packet processed first can be transmitted prior to another TCP packet processed later.

In some embodiments, the packet determining module 203 includes a numbering unit configured to number the TCP ACK packet to determine a transmission priority of the TCP ACK packet.

In some embodiments, the packet determining module 203 may further include an encryption unit. The numbering unit is further configured to: after numbering the TCP ACK packet, call the encryption unit. The encryption unit is configured to encrypt the numbered TCP ACK packet such that the transmission priority of the TCP ACK packet can be fixed, to prevent the transmitting order from being tampered.

It should be understood that in response to the packet determining module 203 determines that only the TCP data packet exists in the TCP packet, no TCP ACK packet is stored in the first data storage queue.

In response that the packet determining module 203 determines that in the current network environment, for example, under a current link condition of the network, the TCP packet to be processed by the receiving terminal in the current cycle affects an overall transmitting throughput and the impact on the overall transmitting throughput is unacceptable, processing of the TCP data packet stored in the second data storage queue is suspended. In response that the TCP packet to be processed by the receiving terminal in the current cycle does not affect the overall transmitting throughput or the impact is acceptable, the TCP data packet stored in the second data storage queue starts to be processed.

It should be understood that in response to the packet determining module determines that only the TCP data packet exists and that the amount of data to be transmitted by the receiving terminal does not reach the data amount threshold in the current network environment, a part or all of data in the second data storage queue may be processed, as long as the transmitting throughput of the receiving terminal in the current network environment is not affected.

In some embodiments, the transmitting terminal confirms a data amount of the transmitted TCP packet based on a data amount confirmed through the received TCP ACK packet. The data amount confirmed through the received TCP ACK packet is positively correlated with the data amount of the transmitted TCP packet.

In some embodiments, the storage monitoring module may monitor the type of the packet currently stored in the receiving terminal in real time. In response to the packet determining module determines that the TCP ACK packet and the TCP data packet coexist, the TCP ACK packet is processed in higher priority. In response to determining that only the TCP data packet exists, the packet determining module determines based on the current network environment whether to process the TCP data packet. In this way, the receiving terminal can feed back a TCP ACK to the transmitting terminal in an accelerated manner after receiving the TCP packet transmitted by the transmitting terminal while stability of the throughput of the receiving terminal and the transmitting terminal is ensured. Therefore, the transmitting throughput of the transmitting terminal can be improved, and the receiving throughput of the receiving terminal is also improved.

Some embodiments of the present disclosure further provide an electronic device. The electronic device may be represented by a computing device (for example, may be a server device), and includes a memory, at least one processor, and a computer program stored in the memory and executable on the at least one processor. The at least one processor, when executing the computer program, may implement the method for data transmission according to the above embodiments.

Figure 3:
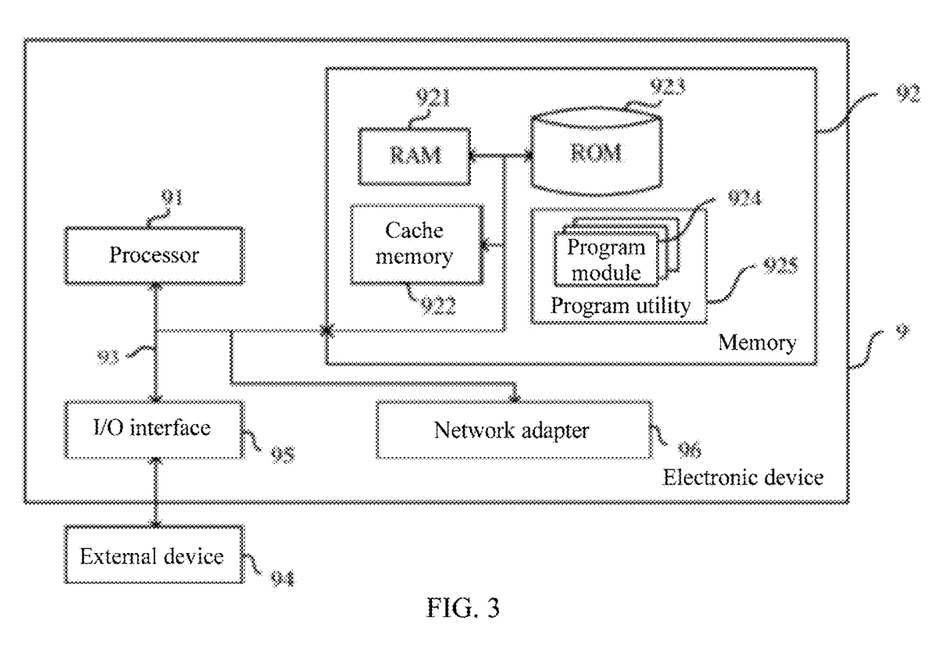
FIG. 3 is a schematic diagram of modules of an electronic device according to one or more embodiments of the present disclosure.

FIG. 3 is a schematic diagram of a hardware structure according to one or more embodiments of the present disclosure. As shown in FIG. 3, an electronic device 9 includes: at least one processor 91, at least one memory 92, and a bus 93 configured to connect various system components (including the processor 91 and the memory 92). The bus 93 may include a data bus, an address bus, and a control bus.

The memory 92 includes a transitory or non-transitory memory, such as a random access memory (RAM) 921 and/or a cache memory 922, and may further include a read-only memory (ROM) 923.

The memory 92 further includes a program/utility 925 including a set of (at least one) program modules 924. The program modules 924 each include, but are not limited to an operating system, one or more applications, other program modules, and programming data. Each of these examples or a combination thereof may include an implementation of a network environment.

The processor 91 runs computer programs stored in the memory 92 to execute various functional applications and process data, for example, the method for data transmission according to the above embodiments.

The electronic device 9 may further communicate with one or more peripheral equipment 94 (for example, a keyboard and a pointing device). Such communication may be performed through an input/output (I/O) interface 95. The electronic device 9 may further communicate with one or more networks (for example, a local area network (LAN), a wide area network (WAN), and/or a public network such as the Internet) through a network adapter 96. The network adapter 96 communicates with other modules of the electronic device 9 through the bus 93. It should be understood that although not shown in the figure, other hardware and/or software modules may be used in combination with the electronic device 9, including but not limited to: microcode, a device driver, a redundant processor, an external disk drive array, a redundant array of independent disks (RAID) system, a tape driver, and a data backup storage system.

It should be noted that although several units/modules or sub-units/sub-modules of the electronic device are mentioned in the above detailed description, this division is merely illustrative but not limiting. It is appreciated that, the features and functions of the two or more units/modules described above may be embodied in one unit/module according to embodiments of the present disclosure. Conversely, the features and functions of one unit/module described above may be further divided to be embodied by a plurality of units/modules.

Some embodiments of the present disclosure further provide a non-transitory storage medium storing a computer program. When the program is executed by a processor, the steps of the method for data transmission according to the above embodiments of the present disclosure are implemented.

The non-transitory storage medium may include, but is not limited to a portable disk, a hard disk, a RAM, a ROM, an erasable programmable ROM, an optical storage device, a magnetic storage device, or any suitable combination thereof.

In some embodiments, the present disclosure may alternatively be implemented in a form of a program product, including programming code. When the program product runs on a terminal device, the programming code is used to enable the terminal device to implement the steps of the method for data transmission according to the above embodiments of the present disclosure.

The programming code for carrying out the present disclosure may be written in any combination of one or more programming languages. The program code may be executed entirely on user equipment, executed partially on the user equipment, executed as an independent software package, executed partially on the user equipment and partially on a remote device, or executed entirely on the remote device.

Although the above embodiments of the present disclosure have been described above, those skilled in the art should understand that these are only embodiments, and the protection scope of the present disclosure is defined by the appended claims. Those skilled in the art can make various changes or modifications to these embodiments without departing from the principle and essence of the present disclosure, but all these changes and modifications shall fall within the protection scope of the present disclosure.

What is claimed is:

1. A method for data transmission, applied to a receiving terminal comprising a transmission control protocol (TCP) data transmission module, wherein the method comprises:
    monitoring a TCP packet currently stored in the TCP data transmission module, wherein the TCP packet comprises at least one of a TCP acknowledgment (ACK) packet or a TCP data packet, and the TCP data packet comprises another type of TCP packet other than the TCP ACK packet;
    determining whether the TCP ACK packet and the TCP data packet coexist in the TCP packet;
    in response to the determination that the TCP ACK packet and the TCP data packet coexist in the TCP packet, processing the TCP ACK packet;
    in response to the determination that the TCP ACK packet and the TCP data packet do not coexist, determining whether only the TCP data packet exists in the TCP packet;
    in response to the determination that only the TCP data packet exists in the TCP packet, determining whether an amount of data currently processed and to be transmitted by the receiving terminal reaches a data amount threshold in a current network environment;
    in response to the determination that the amount of data does not reach the data amount threshold, processing the TCP data packet;
    in response to the determination that the amount of data reaches the data amount threshold, processing a minimal portion of the TCP data packet to prevent prioritized transmission of subsequent TCP ACK packets from being blocked due to an accumulation of TCP data after most recent transmission, without wasting resources for a next transmission, and determining whether the receiving terminal has enough data for the next transmission to avoid wasting grant or assignment; and
    in response to the determination that the receiving terminal has adequate data for the next transmission, determining whether the TCP ACK packet and the TCP data packet coexist in the TCP packet.

2. The method for data transmission according to claim 1, wherein the TCP data transmission module comprises a first data storage queue and a second data storage queue, the first data storage queue is configured to store the TCP ACK packet, and the second data storage queue is configured to store the TCP data packet, and
    the method further comprises:
    in response to receiving the TCP packet transmitted by a transmitting terminal, storing the TCP ACK packet in the TCP packet in the first data storage queue, and storing the TCP data packet in the TCP packet in the second data storage queue.

3. The method for data transmission according to claim 1, wherein prior to determining whether the amount of data currently processed and to be transmitted by the receiving terminal reaches the data amount threshold in the current network environment, the method further comprises: calculating the data amount threshold based on a maximum transmitting capability configured by the current network environment for the receiving terminal and a previous actual transmitting condition of the receiving terminal within a preset time interval.

4. The method for data transmission according to claim 1, wherein processing the TCP ACK packet comprises:

numbering the TCP ACK packet to determine a transmission priority of the TCP ACK packet.

5. The method for data transmission according to claim 4, subsequent to numbering the TCP ACK packet, further comprising:
encrypting the numbered TCP ACK packet.

6. A system for data transmission, applied to a receiving terminal, the system comprising:
at least one processor; and
a memory configured to store instructions executable by the at least one processor; wherein the at least one processor is configured to execute the instructions to:
monitor a transmission control protocol (TCP) packet currently stored in a TCP data transmission module of the receiving terminal, wherein the TCP packet comprises at least one of a TCP acknowledgment (ACK) packet or a TCP data packet;
determine whether the TCP ACK packet and the TCP data packet coexist in the TCP packet;
in response to the determination that the TCP ACK packet and the TCP data packet coexist, process the TCP ACK packet in response to the determination that the TCP ACK packet and the TCP data packet do not coexist, determine whether only the TCP data packet exists in the TCP packet;
in response to the determination that only the TCP data packet exists in the TCP packet, determine whether an amount of data currently processed and to be transmitted by the receiving terminal reaches a data amount threshold in a current network environment;
in response to the determination that the amount of data does not reach the data amount threshold, process the TCP data packet;
in response to the determination that the amount of data reaches the data amount threshold, process a minimal portion of the TCP data packet to prevent prioritized transmission of subsequent TCP ACK packets from being blocked due to an accumulation of TCP data after most recent transmission, without wasting resources for a next transmission, and determine whether the receiving terminal has enough data for the next transmission to avoid wasting grant or assignment; and
in response to the determination that the receiving terminal has adequate data for the next transmission, determine whether the TCP ACK packet and the TCP data packet coexist in the TCP packet.

7. The system for data transmission according to claim 6, wherein the at least one processor is further configured to implement a first data storage queue and a second data storage queue, the first data storage queue is configured to store the TCP ACK packet, and the second data storage queue is configured to store the TCP data packet; and
the at least one processor is further configured to: in response to receiving the TCP packet transmitted by a transmitting terminal, store the TCP ACK packet in the TCP packet in the first data storage queue and store the TCP data packet in the TCP packet in the second data storage queue.

8. The system for data transmission according to claim 6, wherein the at least one processor is further configured to calculate the data amount threshold based on a maximum transmitting capability configured by the current network environment for the receiving terminal and a previous actual transmitting condition of the receiving terminal within a preset time interval.

9. The system for data transmission according to claim 6, wherein the at least one processor is further configured to number the TCP ACK packet to determine a transmission priority of the TCP ACK packet.

10. The system for data transmission according to claim 9, wherein the at least one processor is further configured to: subsequent to numbering of the TCP ACK packet, encrypt the numbered TCP ACK packet.

11. A non-transitory storage medium storing computer program instructions thereon, the computer program instructions, when executed by a processor, cause the processor to:
monitor a transmission control protocol (TCP) packet currently stored in a TCP data transmission module of a receiver terminal, wherein the TCP packet comprises at least one of a TCP acknowledgment (ACK) packet or a TCP data packet, and the TCP data packet comprises another type of TCP packet other than the TCP ACK packet;
determine whether the TCP ACK packet and the TCP data packet coexist in the TCP packet;
in response to the determination that the TCP ACK packet and the TCP data packet coexist in the TCP packet, process the TCP ACK packet;
in response to the determination that the TCP ACK packet and the TCP data packet do not coexist, determining whether only the TCP data packet exists in the TCP packet;
in response to the determination that only the TCP data packet exists in the TCP packet, determining whether an amount of data currently processed and to be transmitted by the receiving terminal reaches a data amount threshold in a current network environment;
in response to the determination that the amount of data does not reach the data amount threshold, processing the TCP data packet;
in response to the determination that the amount of data reaches the data amount threshold, processing a minimal portion of the TCP data packet to prevent prioritized transmission of subsequent TCP ACK packets from being blocked due to an accumulation of TCP data after most recent transmission, without wasting resources for a next transmission, and determining whether the receiving terminal has enough data for the next transmission to avoid wasting grant or assignment; and
in response to the determination that the receiving terminal has adequate data for the next transmission, determining whether the TCP ACK packet and the TCP data packet coexist in the TCP packet.

12. The non-transitory storage medium according to claim 11, wherein the TCP data transmission module comprises a first data storage queue and a second data storage queue, the first data storage queue is configured to store the TCP ACK packet, and the second data storage queue is configured to store the TCP data packet,
the computer program instructions are further configured to:
in response to receiving the TCP packet transmitted by a transmitting terminal, store the TCP ACK packet in the TCP packet in the first data storage queue, and store the TCP data packet in the TCP packet in the second data storage queue.

13. The non-transitory storage medium according to claim 11, wherein, prior to determining whether the amount of data currently processed and to be transmitted by the receiving terminal reaches the data amount threshold in the current network environment, the computer program instructions are further configured to:

calculate the data amount threshold based on a maximum transmitting capability configured by the current network environment for the receiving terminal and a previous actual transmitting condition of the receiving terminal within a preset time interval.

14. The non-transitory storage medium according to claim 11, wherein processing the TCP ACK packet comprises: number the TCP ACK packet to determine a transmission priority of the TCP ACK packet.

15. The non-transitory storage medium according to claim 14, wherein the computer program instructions are further configured to: subsequent to number the TCP ACK packet, encrypt the numbered TCP ACK packet.

* * * * *